(12) United States Patent
Tsuboi

(10) Patent No.: US 12,704,618 B2
(45) Date of Patent: Aug. 11, 2026

(54) SOUND WAVE PROCESSING DEVICE AND ULTRASONIC SYSTEM

(71) Applicant: Rohm Co., Ltd., Kyoto (JP)

(72) Inventor: Takahiro Tsuboi, Kyoto (JP)

( * ) Notice: Subject to any disclaimer, the term of this patent is extended or adjusted under 35 U.S.C. 154(b) by 150 days.

(21) Appl. No.: 18/534,469

(22) Filed: Dec. 8, 2023

(65) Prior Publication Data

US 2024/0103147 A1 Mar. 28, 2024

Related U.S. Application Data

(63) Continuation of application No. PCT/JP2022/022919, filed on Jun. 7, 2022.

(30) Foreign Application Priority Data

Jun. 9, 2021 (JP) ................................ 2021-096562

(51) Int. Cl.

| | |
|---|---|
| ***G01S 15/10*** | (2006.01) |
| ***G01S 7/524*** | (2006.01) |
| ***G01S 7/527*** | (2006.01) |
| ***G01S 15/931*** | (2020.01) |

(52) U.S. Cl.

CPC ............ *G01S 7/524* (2013.01); *G01S 7/5273* (2013.01); *G01S 15/10* (2013.01); *G01S 15/931* (2013.01)

(58) Field of Classification Search

CPC ........ G01S 7/524; G01S 7/5273; G01S 15/10; G01S 15/931

See application file for complete search history.

(56) References Cited

U.S. PATENT DOCUMENTS 7,883,466 B2 * 2/2011 Adachi ............... G01S 15/8963 600/407

FOREIGN PATENT DOCUMENTS

JP 2020-060410 4/2020
WO WO-2014097479 A1 * 6/2014 ........... G01S 15/102

OTHER PUBLICATIONS

International Search Report and Written Opinion in International Appln. No. PCT/JP2022/022919, mailed on Aug. 2, 2022, 11 pages (with machine translation).

* cited by examiner

*Primary Examiner* — Abdallah Abulaban

(57) ABSTRACT

A burst drive signal has a sensor drive period for transmitting a first drive signal, and an interval period provided between the sensor drive periods adjacent to each other, for transmitting a second drive signal. The first drive signal has a frequency within a frequency band of a band pass filter. The second drive signal has a frequency that is different from a resonant frequency of a sensor element and is outside the frequency band of the band pass filter.

10 Claims, 4 Drawing Sheets

10
1
driving unit
41
Sdv
5
Tr
T1
2
DA circuit
T2
BPF
42
sensor drive period detection unit
interval period detection unit
RS
43
44
T3
32
LPF
ADC
33
analog front end
T4
31
3
45
46
TOF measuring unit
counter
461
own wave determination unit
47
DSI3
T5
digital processing nit
4

Sdv
SGD
Tdv
Tit
Tdv
Tit
Tdv
Wr
W1
W2
Tdv
Tit
Tdv
Tit
Tdv
SPwr
0
Tdv
Tit
Tdv
Tit
Tdv
BPF_OUT
OUT1
OUT2
Tdv
Tit
Tdv
Tit
Tdv

Sdv
Wr
SPwr
BPF_OUT
SGD1
SGD2
W1
W3
OUT1
Tdv
Tit

SOUND WAVE PROCESSING DEVICE AND ULTRASONIC SYSTEM

CROSS-REFERENCE TO RELATED APPLICATIONS

This nonprovisional application is a continuation application of International Patent Application No. PCT/JP2022/022919 filed on Jun. 7, 2022, which claims priority Japanese Patent Application No. 2021-096562 filed on Jun. 9, 2021, the entire contents of which are hereby incorporated by reference.

TECHNICAL FIELD

The present disclosure relates to a sound wave processing device and an ultrasonic system.

BACKGROUND ART

Conventionally, there is known an ultrasonic system that measures a distance to an obstacle, by generating a sound wave and measuring time TOF (Time Of Flight) until returning of a reflected wave from the obstacle. Conventionally, this ultrasonic system is usually mounted on a vehicle, and an on-vehicle clearance sonar is known as an example.

As an example of the ultrasonic system, Patent Document 1 discloses an ultrasonic system that transmits an ultrasonic wave by driving a sensor element (piezoelectric element) based on a burst driving pattern of burst waves between which a time interval is disposed.

LIST OF CITATIONS

Patent Literature

Patent Document 1: JP-A-2020-60410

DESCRIPTION OF EMBODIMENTS

Hereinafter, an exemplified embodiment of the present disclosure is described with reference to the drawings. Note that an ultrasonic system according to the embodiment described below is intended to be mounted on a vehicle as an example, and can be used for a warning function, an automatic braking function, an automatic parking function, or the like, by measuring a distance between the vehicle and an object.

1. Structure of Ultrasonic System

Figure 1:
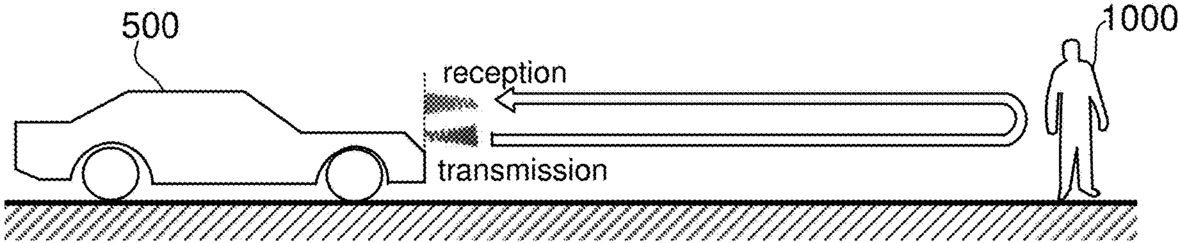
FIG. 1 is a diagram schematically illustrating an example of a vehicle equipped with an ultrasonic system and an object.

FIG. 1 is a diagram schematically illustrating an example of a vehicle 500 equipped with an ultrasonic system (not shown) that will be described later and an object (obstacle) 1000. The ultrasonic wave transmitted from the ultrasonic system is reflected by the object 1000 and is received as a reflected wave by the ultrasonic system. The ultrasonic system measures a distance between the vehicle 500 and the object 1000, on the basis of time after transmission of the ultrasonic wave until reception of the same. In other words, the ultrasonic system measures a distance by a so-called TOF (Time Of Flight) method.

Figure 2:
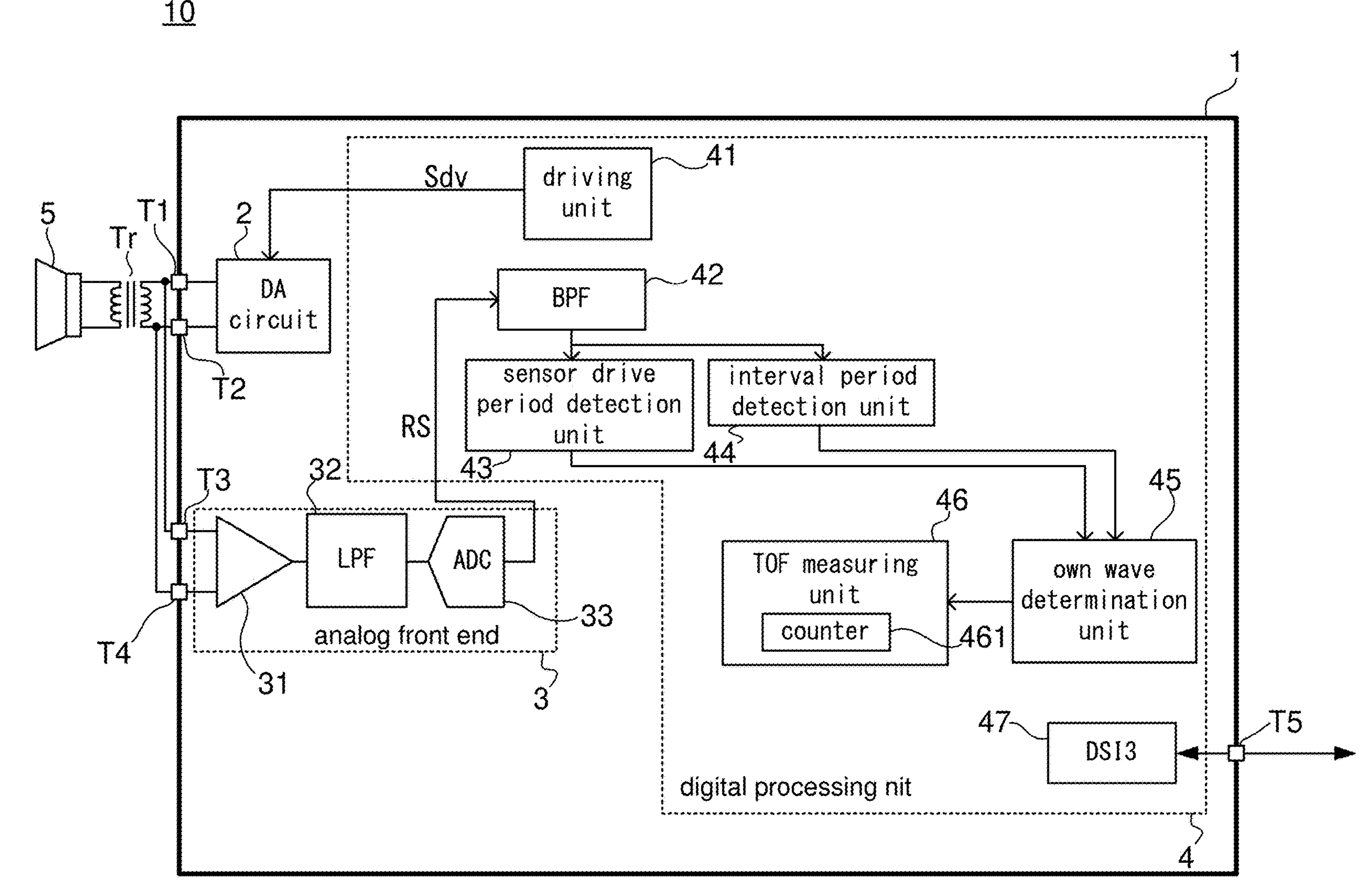
FIG. 2 is a diagram illustrating a structure of an ultrasonic system using a sound wave processing device according to an exemplified embodiment of the present disclosure.

FIG. 2 is a diagram illustrating a structure of an ultrasonic system 10 using a sound wave processing device 1 according to the exemplified embodiment of the present disclosure.

The ultrasonic system 10 includes the sound wave processing device 1, an ultrasonic wave transmitting/receiving device 5, and a transformer Tr. The ultrasonic wave transmitting/receiving device 5 is externally connected to the sound wave processing device 1 via the transformer Tr. Note that it is not always necessary to dispose the transformer Tr.

The sound wave processing device 1 is a semiconductor device including a DA circuit 2, an analog front end 3, and a digital processing unit 4, which are integrated in a single chip. In addition, the sound wave processing device 1 further includes external terminals T1 to T5 for establishing external electrical connection.

The DA circuit 2 performs D/A conversion of a burst drive signal Sdv output from a driving unit 41 included in the digital processing unit 4, from a digital signal to an analog signal. The DA circuit 2 is connected to a primary side of the transformer Tr via the external terminals T1 and T2.

A secondary side of the transformer Tr1 is connected to the ultrasonic wave transmitting/receiving device 5. The ultrasonic wave transmitting/receiving device 5 includes a not-shown sensor element (piezoelectric element) so as to perform transmission and reception of the ultrasonic wave. In other words, the ultrasonic wave transmitting/receiving device 5 functions as both a sound source and a receiver.

The DA circuit 2 flows current in the transformer Tr based on the burst drive signal Sdv generated by the driving unit 41. In this way, the sensor element is driven, and the ultrasonic wave is transmitted from the ultrasonic wave transmitting/receiving device 5. In other words, the driving unit 41 drives the sensor element based on the burst drive signal Sdv. Note that a structure of the burst drive signal Sdv will be described later.

The analog front end 3 (received wave signal output unit) includes a low noise amplifier (LNA) 31 and a low pass filter (LPF) 32, and an A/D converter 33. The primary side of the transformer Tr is connected to the LNA 31 via the external terminals T3 and T4. An output of the LNA 31 is input to the A/D converter 33 via the LPF 32.

The ultrasonic wave is received by the sensor element of the ultrasonic wave transmitting/receiving device 5 and is converted into an electric signal, which is output as a received wave signal RS via the transformer Tr and the analog front end 3.

The digital processing unit 4 includes the driving unit 41, a band pass filter (BPF) 42, a sensor drive period detection unit 43, an interval period detection unit 44, an own wave determination unit 45, a TOF measuring unit 46, and a serial interface 47.

The BPF 42 passes only signals within a predetermined frequency band in the received wave signal RS output from the analog front end 3, and removes signals outside the frequency band.

The sensor drive period detection unit 43 detects the sensor drive period based on an output of the BPF 42. More specifically, it detects the number of the sensor drive periods.

Note that the sensor drive period is a period included in the burst drive signal Sdv as described later, and is a period for transmitting the drive signal to drive the sensor element.

The interval period detection unit 44 detects the interval period based on the output of the BPF 42. More specifically, it detects a length of the interval period. Note that the interval period is a period included in the burst drive signal Sdv as described later, and is disposed between the sensor drive periods adjacent to each other.

The own wave determination unit 45 determines whether or not the received ultrasonic wave is the reflected wave that is transmitted from the own ultrasonic system 10 and is reflected by the object (own wave), based on a detection result of the sensor drive period detection unit 43 and a detection result of the interval period detection unit 44. In the burst drive signal Sdv, by setting parameters such as the number of the sensor drive periods and the length of the interval period, the ultrasonic wave to be transmitted is characterized so that the ultrasonic system 10 can be assigned with an ID. The own wave determination unit 45 checks whether or not the detection result of the sensor drive period detection unit 43 and the detection result of the interval period detection unit 44 agree with the parameters set for the own ultrasonic system 10 (the sound wave processing device 1), and hence it can determine whether or not the received ultrasonic wave is the own wave.

The TOF measuring unit 46 measures time (TOF) from transmission of the ultrasonic wave to reception of the reflected wave from the object, using a counter 461. More specifically, the TOF measuring unit 46 acquires measured distance information, which is a count value after the driving unit 41 starts output of the burst drive signal Sdv (i.e., after starting to drive the sensor element) until the own wave determination unit 45 determines that the received ultrasonic wave is the own wave.

The serial interface 47 conforms to DSI3, for example, and communicates with a not-shown external ECU (Electronic Control Unit of a vehicle) via the external terminal T5. The acquired count value described above is sent to the ECU via the serial interface 47.

2. Comparative Example

Figure 3:
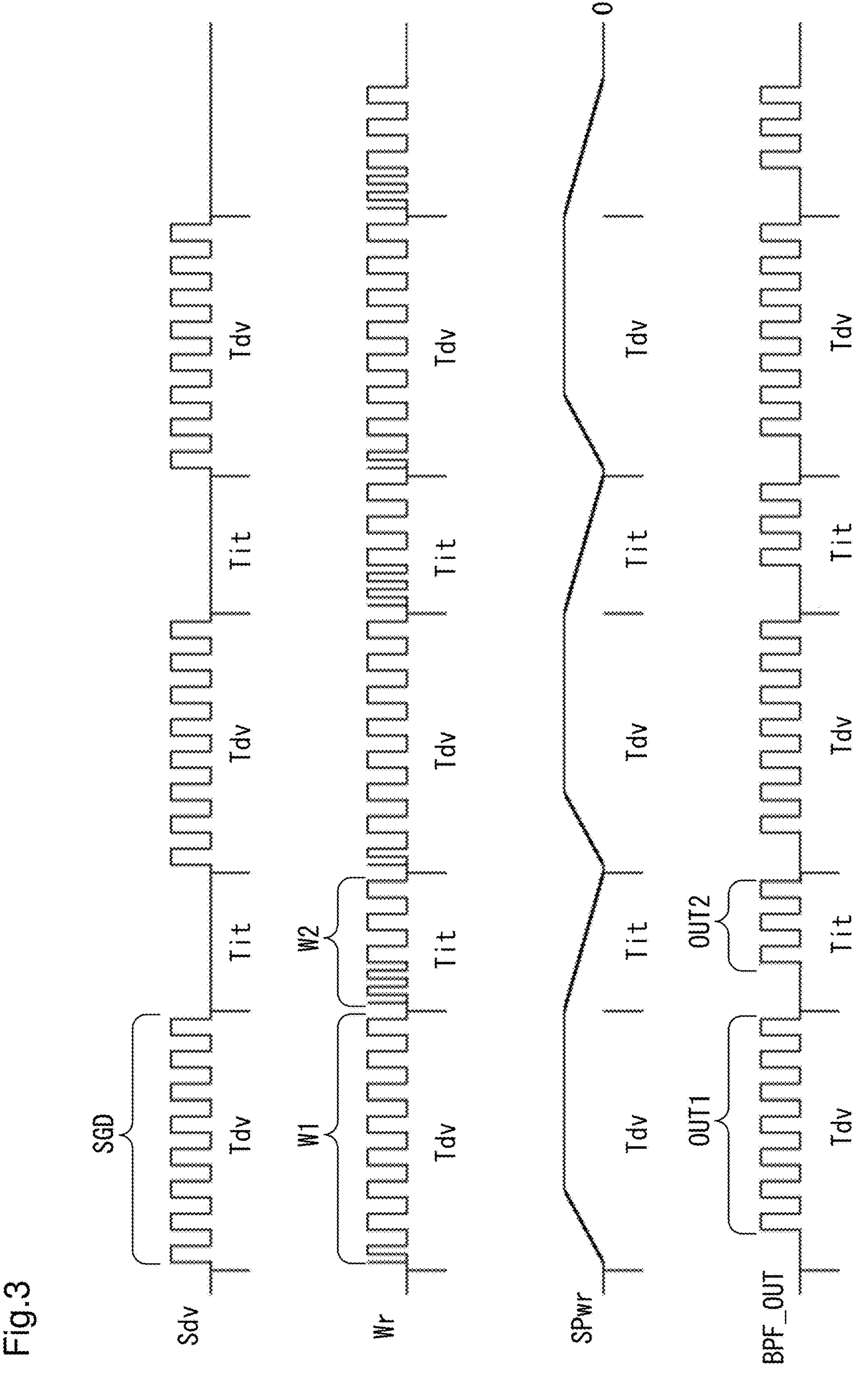
FIG. 3 is a timing chart illustrating an operation example in a case where a sensor driving method according to a comparative example is performed.

Here, before description of the sensor driving method according to the present disclosure in the ultrasonic system 10 of the above structure, the sensor driving method according to a comparative example is described. FIG. 3 is a timing chart showing an operation example in a case where the ultrasonic system 10 (FIG. 2) performs a sensor driving method according to the comparative example. Note that FIG. 3 (and FIG. 4 described later) shows an example of waveforms of the burst drive signal Sdv, a reflected wave Wr, a sound pressure SPwr (lowest level=0) of the reflected wave Wr, and the output BPF_OUT of the BPF 42, in order from top to bottom. The reflected wave Wr is a reflected wave based on the ultrasonic wave transmitted from the ultrasonic wave transmitting/receiving device 5 when the sensor element is driven by the burst drive signal Sdv.

As illustrated in FIG. 3, the burst drive signal Sdv has a sensor drive period Tdv and an interval period Tit. In the sensor drive period Tdv, a drive signal SGD consisting of a pulse signal (unit pulse wave) is transmitted. The drive signal SGD preferably has a frequency equal to a resonant frequency of the sensor element. In this way, when the sensor element is driven by the drive signal SGD, the ultrasonic wave to be transmitted can have a large sound pressure. FIG. 3 shows an example of the case where the drive signal SGD has a frequency equal to the resonant frequency.

The interval period Tit is disposed between the sensor drive periods Tdv adjacent to each other. In other words, in the burst drive signal Sdv, the drive signal SGD is intermittently transmitted. In the sensor driving method of the comparative example, the drive signal is not transmitted during the interval period Tit.

In the example of FIG. 3, the number of the sensor drive periods Tdv is set to three, and hence there are two interval periods Tit. In addition, in the example of FIG. 3, the two interval periods Tit are set to have the same length. However, the number of the sensor drive periods Tdv may be any plural number other than 3, and the interval periods Tit may include ones having different lengths in a case where there are a plurality of the interval periods Tit. In this way, by setting the number of the sensor drive periods Tdv and the length of the interval period Tit, the ultrasonic wave to be transmitted can have characteristics.

When the sensor element is driven by the burst drive signal Sdv, the ultrasonic wave is transmitted and is reflected by the object, and hence the reflected wave Wr illustrated in FIG. 3 is generated. Here, the reflected wave Wr illustrated in FIG. 3 (and FIG. 4 described later) is simplified to be a rectangular wave for convenience sake, but in reality it is an analog wave (such as a sine wave), which has the frequency of the rectangular wave shown in the diagram and the sound pressure SPwr shown in the diagram.

As illustrated in FIG. 3, the reflected wave Wr has a drive wave W1 corresponding to the drive signal SGD during the sensor drive period Tdv. After driving of the sensor element is started, the frequency of the drive wave W1 is converged to the frequency of the drive signal SGD (i.e., the resonant frequency). When the frequency is converged, the sound pressure SPwr is held at a high level.

In addition, during the interval period Tit, the drive signal is not transmitted, but the reflected wave Wr includes a reverberation wave W2 due to damped oscillation of the sensor element. In the reverberation wave W2, the sound pressure SPwr is attenuated, and the frequency is converged to the resonant frequency.

Here, the resonant frequency (i.e., the frequency of the drive signal SGD) is within the frequency band of the BPF 42. For instance, the resonant frequency is the center frequency of the frequency band. In this way, as illustrated in FIG. 3, an output signal OUT1 of the resonant frequency appears in the output BPF_OUT of the BPF 42, corresponding to the waveform of the resonant frequency in the drive wave W1. Note that in FIG. 3 (and FIG. 4 described later), the output BPF_OUT is simplified to be a rectangular wave for convenience sake, but in reality the output BPF_OUT has a waveform of the frequency of the rectangular wave shown in the diagram and a sound pressure corresponding to the sound pressure SPwr shown in the diagram.

In addition, an output signal OUT2 of the resonant frequency appears in the output BPF_OUT, corresponding to the waveform of the resonant frequency having the sound pressure SPwr higher than a certain level in the reverberation wave W2. In other words, the waveform of the resonant frequency having the sound pressure SPwr higher than a certain level in the reverberation wave W2 cannot be removed by the BPF 42.

Here, the sensor drive period detection unit 43 detects the number of sections having a sound pressure of the output BPF_OUT of the BPF 42 higher than a predetermined level, for example, so as to detect the number of the sensor drive periods. In the example of FIG. 3, the number of the sensor drive periods Tdv is set to three, but the detection result of the number of the sensor drive periods Tdv based on the output BPF_OUT is five, because the output signal OUT2 due to an influence of the reverberation wave W2 is also included in count of the number. In this way, the own wave determination unit 45 may erroneously determine that the received ultrasonic wave is not the own wave.

In addition, the interval period detection unit 44 detects the interval period, which is a period during which the output BPF_OUT of the BPF 42 has a sound pressure level lower than a predetermined level, for example. However, in the example of FIG. 3, because of the output signal OUT2 due to the influence of the reverberation wave W2, the period between the output signals OUT1 and OUT2 is detected as the interval period. The length of the detected period does not match the set length of the interval period Tit, and hence the own wave determination unit 45 may erroneously determine that the received ultrasonic wave is not the own wave.

In this way, in the comparative example, erroneous determination may be made in the own wave determination, due to the influence of reverberation when the sensor element is driven. The sensor driving method according to the present disclosure described below is implemented to solve the problem described above.

3. Sensor Driving Method of Present Disclosure

Figure 4:
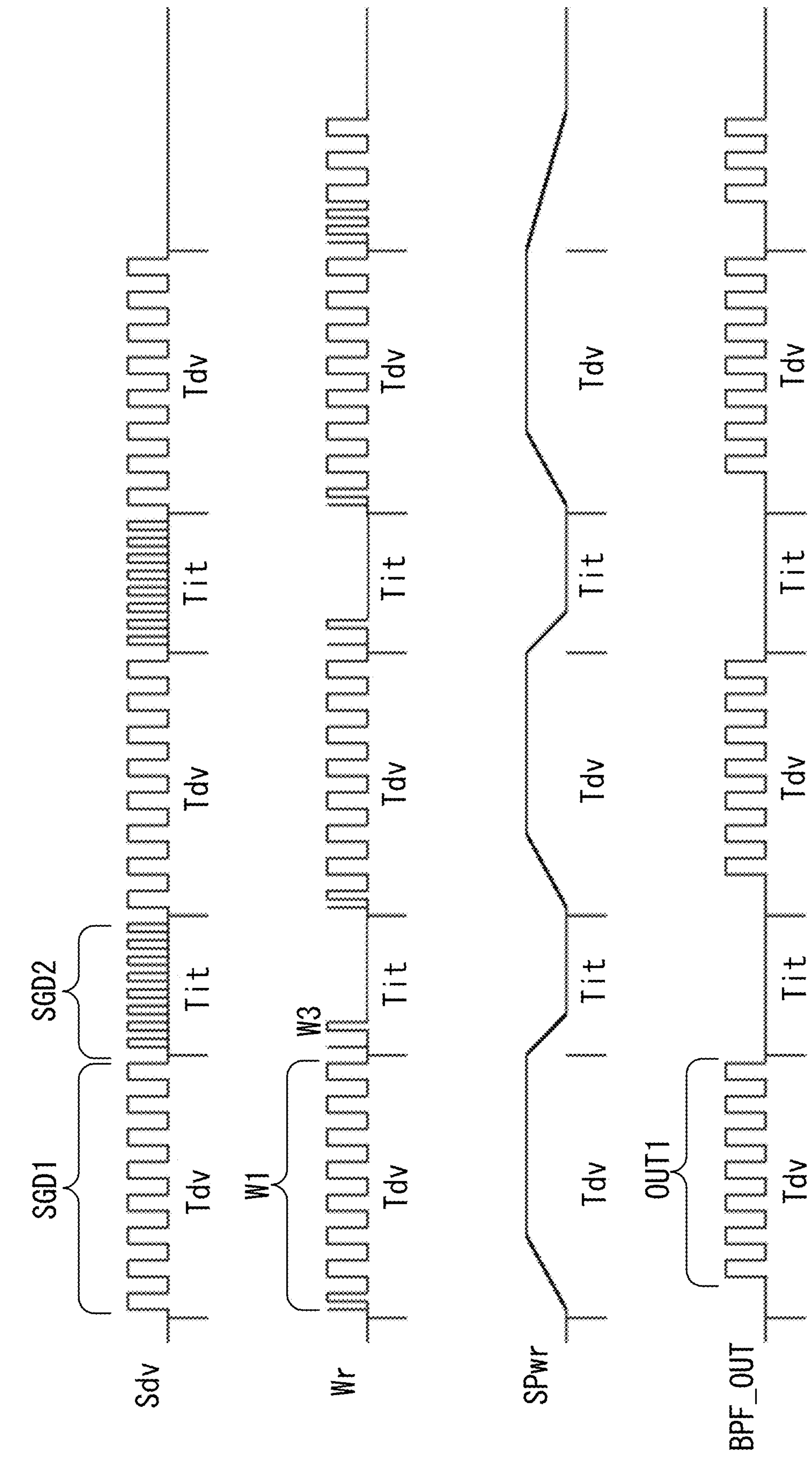
FIG. 4 is a timing chart illustrating an operation example in a case where the sensor driving method according to the present disclosure is performed.

FIG. 4 is a timing chart showing an operation example in a case where the ultrasonic system 10 (FIG. 2) performs the sensor driving method according to the present disclosure. In the sensor driving method according to the present disclosure, as illustrated in FIG. 4, a first drive signal SGD1 is transmitted in the sensor drive period Tdv of the burst drive signal Sdv similarly to the comparative example (FIG. 3), but in the interval period Tit, unlike the comparative example, a second drive signal SGD2 is transmitted. In other words, in the sensor driving method according to the present disclosure, the first drive signal SGD1 that is a main drive signal is intermittently transmitted by the burst drive signal Sdv.

The second drive signal SGD2 has a frequency outside the frequency band of the BPF 42. In other words, the second drive signal SGD2 has a frequency different from the first drive signal SGD1 (i.e., the resonant frequency).

Note that in FIG. 4, the frequency of the second drive signal SGD2 is set to a frequency higher than the frequency band of the BPF 42, but it may be set to a frequency lower than the frequency band. However, if it is set to a frequency higher than the frequency band of the BPF 42, the interval period Tit can be shortened with respect to the same wave number of the unit pulse wave constituting the second drive signal SGD2. Therefore, the entire length of the burst drive signal Sdv can be shortened.

In this case, as illustrated in FIG. 4, in the reflected wave Wr, the drive wave W1 appears corresponding to the first drive signal SGD1, similarly to the comparative example. However, as the second drive signal SGD2 has a frequency different from the resonant frequency, the sound pressure of the ultrasonic wave transmitted when the sensor element is driven is decreased (becomes substantially zero). Therefore, as illustrated in FIG. 4, in the reflected wave Wr, during the period corresponding to the second drive signal SGD2 (the interval period Tit), no waveform appears after a driving wave W3 when the sound pressure SPwr is attenuated (the sound pressure SPwr is zero). Note that the driving wave W3 has a frequency equal to the frequency of the second drive signal SGD2.

In this way, as illustrated in FIG. 4, in the output BPF_OUT of the BPF 42, similarly to the comparative example, the output signal OUT1 appears corresponding to the drive wave W1. However, the driving wave W3 generated in the reflected wave Wr during the interval period Tit has a frequency outside the frequency band of the BPF 42, and hence the driving wave W3 is removed by the BPF 42 and does not appear in the output BPF_OUT. In addition, in the interval period Tit, no waveform is generated after the driving wave W3, and hence no waveform is generated in the output BPF_OUT, too.

In this way, in the sensor driving method according to the present disclosure, the second drive signal SGD2 having a frequency different from the resonant frequency is transmitted during the interval period Tit, and hence it is possible that no waveform is generated in the reflected wave Wr during the interval period Tit, or even if a waveform is generated, it has a frequency outside the frequency band of the BPF 42, and hence it is possible that no waveform is generated in the output BPF_OUT during the interval period Tit. Therefore, detection results of the sensor drive period detection unit 43 and the interval period detection unit 44 agree with setting, and the own wave determination unit 45 determines the received ultrasonic wave is the own wave, so that erroneous determination can be avoided.

Note that the interval period Tit preferably has a length more than or equal to a length of four waves of the unit pulse wave constituting the second drive signal SGD2, in consideration of tracking of the sensor element to the second drive signal SGD2.

4. Others

Although the exemplified embodiment is described above, the embodiment can be variously modified within the spirit of the present invention.

For instance, the DA circuit 2 may be connected to an ultrasonic wave transmitting device for transmission, while the analog front end 3 may be connected to an ultrasonic wave receiving device for reception, which is different from the ultrasonic wave transmitting device. In other words, a sound source and a receiver may not be the same device.

In addition, the ultrasonic system including the sound wave processing device may be mounted on a mobile body other than a vehicle, and it may be mounted on an unmanned transport robot or a service robot for transporting a baggage, or the like, for example. In addition, the ultrasonic system may be mounted not on a mobile body but on a fixed object.

5. Additional Remarks

As described above, a sound wave processing device (1) according to one aspect of the present disclosure includes:

- a driving unit (41) that outputs a burst drive signal (Sdv) so as to drive a sensor element for transmitting a sound wave;
- a received wave signal output unit (3) that outputs a received wave signal (RS) based on the received sound wave;
- a band pass filter (42) to which the received wave signal is input; and
- an own wave determination unit (45) that determines whether or not the received sound wave is a reflected wave based on the sound wave transmitted from own ultrasonic system (10) including the sound wave processing device, on the basis of an output of the band pass filter, wherein the burst drive signal has a sensor drive period (Tdv) for transmitting a first drive signal (SGD1), and an interval period (Tit) disposed between the sensor drive periods adjacent to each other, for transmitting a second drive signal (SGD2), the first drive signal has a frequency within a frequency band of the band pass filter, and the second drive signal has a frequency that is different from a resonant frequency of the sensor element and is outside the frequency band of the band pass filter (first structure).

In addition, in the first structure described above, the second drive signal may have a frequency higher than the frequency band of the band pass filter (second structure).

In addition, in the first or second structure described above, the first drive signal may have a frequency equal to the resonant frequency (third structure).

In addition, in any one of the first to third structures described above, the interval period may have a length more than or equal to a length of four waves of a unit waveform constituting the second drive signal (fourth structure).

In addition, in any one of the first to fourth structures described above, the sound wave processing device may further include a sensor drive period detection unit (43) that detects the number of the sensor drive periods based on the output of the band pass filter, wherein the own wave determination unit may perform the own wave determination on the basis of a detection result of the sensor drive period detection unit (fifth structure).

In addition, in any one of the first to fifth structures described above, the sound wave processing device may further include an interval period detection unit (44) that detects a length of the interval period on the basis of the output of the band pass filter, wherein the own wave determination unit may perform the own wave determination on the basis of a detection result of the interval period detection unit (sixth structure).

In addition, in the sixth structure described above, among a plurality of the interval periods, it may be possible to set the interval periods having different lengths (seventh structure).

In addition, in any one of the first to seventh structures described above, the sound wave processing device may further include a DA circuit (2) that performs D/A conversion of the burst drive signal output from the driving unit so as to drive the sensor element (eighth structure).

In addition, in any one of the first to eighth structures described above, the received wave signal output unit may include a LNA (low noise amplifier) (31), a LPF (low pass filter) (32) disposed after the LNA, and an A/D converter (33) disposed after the LPF (ninth structure).

In addition, an ultrasonic system (10) according to one aspect of the present disclosure may include the sound wave processing device having any one of the first to ninth structures described above, and a sensor element that is driven by the sound wave processing device.

In addition, the ultrasonic system described above is mounted on a vehicle, for example.

INDUSTRIAL APPLICABILITY

The present disclosure can be used for an on-vehicle ultrasonic system, for example.

LIST OF REFERENCE SIGNS

1 sound wave processing device
2 DA circuit
3 analog front end
4 digital processing unit
5 ultrasonic wave transmitting/receiving device
10 ultrasonic system
31 LNA
32 LPF
33 A/D converter
41 driving unit
42 BPF
43 sensor drive period detection unit
44 interval period detection unit
45 own wave determination unit
46 TOF measuring unit
47 serial interface
461 counter
500 vehicle
1000 object
T1 to T5 external terminal

The invention claimed is:

1. A sound wave processing device comprising:

a driving unit that outputs a burst drive signal so as to drive a sensor element for transmitting a sound wave;

a received wave signal output unit that outputs a received wave signal based on a received sound wave;

a band pass filter to which the received wave signal is input; and an own wave determination unit that determines whether or not the received sound wave is a reflected wave based on a sound wave transmitted from own ultrasonic system including the sound wave processing device, on the basis of an output of the band pass filter, wherein in one session of transmission, the burst drive signal has a sensor drive period for transmitting a first drive signal, and an interval period disposed between the adjacent sensor drive periods of the burst drive signal, for transmitting a second drive signal, the first drive signal has a frequency within a frequency band of the band pass filter, and the second drive signal has a frequency that is different from a resonant frequency of the sensor element and is outside the frequency band of the band pass filter, wherein the second drive signal has a frequency higher than the frequency band of the band pass filter.

2. The sound wave processing device according to claim 1, wherein the first drive signal has a frequency equal to the resonant frequency.

3. The sound wave processing device according to claim 1, wherein the interval period has a length more than or equal to a length of four waves of a unit waveform constituting the second drive signal.

4. The sound wave processing device according to claim 1, further comprising a sensor drive period detection unit that detects the number of the sensor drive periods on the basis of the output of the band pass filter, wherein the own wave determination unit performs the own wave determination on the basis of a detection result of the sensor drive period detection unit.

5. The sound wave processing device according to claim 1, further comprising an interval period detection unit that detects a length of the interval period on the basis of the output of the band pass filter, wherein the own wave determination unit performs the own wave determination on the basis of a detection result of the interval period detection unit.

6. The sound wave processing device according to claim 5, wherein among a plurality of the interval periods, it is possible to set the interval periods having different lengths.

7. The sound wave processing device according to claim 1, further comprising a DA circuit that performs D/A conversion of the burst drive signal output from the driving unit so as to drive the sensor element.

8. The sound wave processing device according to claim 1, wherein the received wave signal output unit includes a LNA (low noise amplifier), a LPF (low pass filter) disposed after the LNA, and an A/D converter disposed after the LPF.

9. An ultrasonic system comprising the sound wave processing device according to claim 1, and a sensor element that is driven by the sound wave processing device.

10. The ultrasonic system according to claim 9, which is mounted on a vehicle.

* * * * *